(12) United States Patent
Choi et al.

(10) Patent No.: US 9,431,658 B2
(45) Date of Patent: Aug. 30, 2016

(54) POSITIVE ELECTRODE FOR LITHIUM BATTERIES, LITHIUM BATTERY INCLUDING THE POSITIVE ELECTRODE, AND METHODS OF MANUFACTURE THEREOF

(71) Applicant: Samsung Electronics Co., Ltd., Suwon-si, Gyeonggi-do (KR)

(72) Inventors: Won-sung Choi, Yongin (KR); Dong-min Im, Yongin-si (KR); Victor Roev, Suwon-si (KR); Young-gyoon Ryu, Suwon-si (KR); Dong-joon Lee, Yongin-si (KR); Seung-sik Hwang, Seongnam-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 154 days.

(21) Appl. No.: 14/248,531

(22) Filed: Apr. 9, 2014

(65) Prior Publication Data

US 2014/0356736 A1 Dec. 4, 2014

(30) Foreign Application Priority Data

May 29, 2013 (KR) ........................ 10-2013-0061258

(51) Int. Cl.
*H01M 4/62* (2006.01)
*H01M 10/0568* (2010.01)
(Continued)

(52) U.S. Cl.
CPC .............. *H01M 4/62* (2013.01); *H01M 4/131* (2013.01); *H01M 4/382* (2013.01); *H01M 4/48* (2013.01); *H01M 4/60* (2013.01); *H01M 4/602* (2013.01); *H01M 4/625* (2013.01); *H01M 4/8652* (2013.01); *H01M 4/8663* (2013.01);
(Continued)

(58) Field of Classification Search
CPC ......... H01M 10/052; H01M 10/0525; H01M 10/0562; H01M 10/0568; H01M 12/065; H01M 2300/0025; H01M 2300/0071; H01M 4/131; H01M 4/382; H01M 4/48; H01M 4/60; H01M 4/602; H01M 4/62; H01M 4/625; H01M 4/8652; H01M 4/8663
See application file for complete search history.

(56) References Cited

U.S. PATENT DOCUMENTS

| 4,630,176 A | 12/1986 | Cuellar et al. |
| 5,501,922 A | 3/1996 | Li et al. |

(Continued)

FOREIGN PATENT DOCUMENTS

| JP | 2010-503462 A | 2/2010 |
| KR | 1987-0005424 A | 6/1987 |

(Continued)

OTHER PUBLICATIONS

David Martel, Neso Sojic, and Alexander Kuhn. A Simple Student Experiment for Teaching Surface Electrochemistry: Adsorption of Polyoxometalate on Graphite Electrodes, Journal of Chemical Education, vol. 79, No. 3, Mar. 2002, 349-352.*

(Continued)

*Primary Examiner* — Carlos Barcena
(74) *Attorney, Agent, or Firm* — Cantor Colburn LLP

(57) ABSTRACT

A positive electrode for a lithium battery including a protected negative electrode containing a lithium metal or a lithium alloy, wherein the positive electrode contains a positive electrode active material, a polyoxometalate compound, and a conductive material. Also provided is a lithium battery including the positive electrode.

13 Claims, 3 Drawing Sheets

(51) Int. Cl.
- *H01M 10/052* (2010.01)
- *H01M 4/38* (2006.01)
- *H01M 4/13* (2010.01)
- *H01M 10/0562* (2010.01)
- *H01M 4/86* (2006.01)
- *H01M 12/06* (2006.01)
- *H01M 4/131* (2010.01)
- *H01M 4/48* (2010.01)
- *H01M 4/60* (2006.01)
- *H01M 10/0525* (2010.01)

(52) U.S. Cl.
CPC ....... *H01M10/052* (2013.01); *H01M 10/0525* (2013.01); *H01M 10/0562* (2013.01); *H01M 10/0568* (2013.01); *H01M 12/065* (2013.01); *H01M 2300/0025* (2013.01); *H01M 2300/0071* (2013.01); *Y02E 60/122* (2013.01); *Y02E 60/50* (2013.01)

(56) References Cited

U.S. PATENT DOCUMENTS

| | | | |
|---|---|---|---|
| 2003/0027052 A1* | 2/2003 | Huang | H01M 10/052 429/304 |
| 2008/0071340 A1 | 3/2008 | Atanasoska et al. | |
| 2010/0273057 A1* | 10/2010 | Watanabe | H01M 4/131 429/223 |
| 2011/0217600 A1* | 9/2011 | Torimizu | H01M 10/0561 429/345 |
| 2013/0149616 A1* | 6/2013 | Lee | H01M 12/06 429/405 |

FOREIGN PATENT DOCUMENTS

| | | |
|---|---|---|
| KR | 1990-0005444 B1 | 7/1990 |
| WO | 2008033546 A2 | 3/2008 |

OTHER PUBLICATIONS

Sankarraj et al., "Improved Oxygen Reduction Cathodes Using Polyoxometalate Cocatalysts", Langmuir, 24, 2008, pp. 632-634.

Ji et al., "A highly ordered nanostructured carbon-sulphur cathode for lithium-sulphur batteries", Nature Materials, vol. 8, Jun. 2009, pp. 500-503.

Jung et al., "An improved high-performance lithium-air battery", Nature Chemistry, vol. 4, Jul. 2012, pp. 579-585.

Wang et al., "Structural change of the porous sulfur cathode using gelatin as a binder during discharge and charge", Electrochimica Acta, 54, 2009, pp. 4062-4066.

\* cited by examiner

POSITIVE ELECTRODE FOR LITHIUM BATTERIES, LITHIUM BATTERY INCLUDING THE POSITIVE ELECTRODE, AND METHODS OF MANUFACTURE THEREOF

CROSS-REFERENCE TO RELATED APPLICATIONS

This application claims priority to and the benefit of Korean Patent Application No. 10-2013-0061258, filed on May 29, 2013, and all the benefits accruing therefrom under 35 U.S.C. §119, the content of which is incorporated herein in its entirety by reference.

BACKGROUND

1. Field

The present disclosure relates to a positive electrode for lithium batteries, a lithium battery including the positive electrode, and methods of manufacture thereof.

2. Description of the Related Art

As electric, electronic, communication, and computer industries have rapidly developed, the need for high capacity batteries has increased. In response to the need, a lithium battery including lithium metal or a lithium alloy as a negative electrode and having a high energy density has received attention.

A positive electrode active material currently used in a lithium air battery or a lithium sulfur battery has a low conductivity, and thus when the positive electrode active material is used an overvoltage increases, and thus an irreversible capacity may increase as a charge voltage increases and a discharge voltage decreases. Therefore, there remains a need for an improved material to reduce overvoltage at the positive electrode active material and provide a higher performance lithium air or lithium sulfur battery.

SUMMARY

Provided is a positive electrode for a lithium battery with improved charging and discharging capacity characteristics and a lithium battery including the positive electrode.

Additional aspects will be set forth in part in the description which follows and, in part, will be apparent from the description.

According to an aspect, a positive electrode for a lithium battery including a protected negative electrode containing a lithium metal or a lithium alloy, wherein the positive electrode includes a positive electrode active material including: a polyoxometalate compound; and a conductive material.

According to another aspect, a lithium battery includes the positive electrode; and a protected negative electrode including lithium metal or a lithium alloy.

Also disclosed is a method of manufacturing a lithium battery, the method including: providing a positive electrode including a conductive material; disposing a protected negative electrode including a negative electrode, a first electrolyte, and a protection layer on the positive electrode; and contacting the positive electrode with a second electrolyte including a polyoxometalate compound to manufacture the lithium battery.

Also disclosed is a method of reducing an overvoltage of a lithium battery, the method including: contacting a positive electrode with a polyoxometalate compound to reduce the overvoltage of the lithium battery, wherein the battery further includes a protected negative electrode, and wherein the protected negative electrode includes a negative electrode including lithium metal or the lithium alloy, a first electrolyte on the negative electrode, and a protection layer on the first electrolyte and proximate to the positive electrode.

Also disclosed is an electrolyte including: an organic solvent; a lithium salt; and a polyoxometalate compound.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
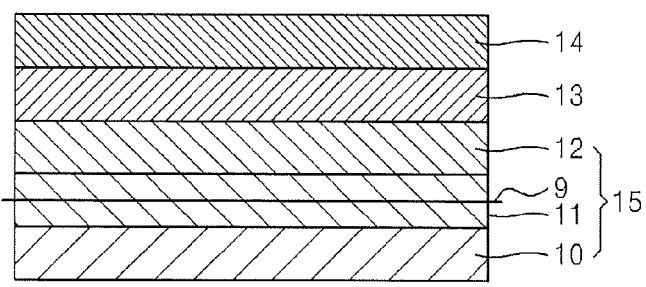
FIG. 1 is a schematic illustration of an embodiment of a lithium battery.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The alkali metals are Li, Na, K, Rb, Cs, and Fr.

The alkaline earth metals are Be, Mg, Ca, Sr, Ba, and Ra.

The elements of the fourth period of the Periodic Table are K, Ca, Sc, Ti, V, Cr, Mn, Fe, Co, Ni, Cu, Zn, Ga, Ge, As, Se, Br, and Kr.

The lanthanoids are the chemical elements with atomic numbers 57 to 71.

The actinoids are the chemical elements with atomic numbers 89 to 103.

"Alkyl" means a straight or branched chain, saturated, monovalent hydrocarbon group (e.g., methyl or hexyl).

"Aryl" means a monovalent group formed by the removal of one hydrogen atom from one or more rings of an arene (e.g., phenyl or napthyl).

The prefix "hetero" means that the compound or group includes at least one a heteroatom (e.g., 1, 2, or 3 heteroatom(s)), wherein the heteroatom(s) is each independently N, O, S, Si, or P.

Hereinafter, a positive electrode for a lithium battery according to an embodiment and a lithium battery including the positive electrode will be disclosed in further detail.

According to an aspect, provided is a positive electrode for a lithium battery which includes a protected negative electrode containing a lithium metal or a lithium alloy, wherein the positive electrode comprises: a positive electrode active material, a polyoxometalate ("POM") compound, and a conductive material.

A standard reduction potential of lithium metal is −3.04 V, and since lithium metal has the lowest reduction potential of solid phase negative electrode active materials, a potential of a battery may be the highest when a negative electrode comprises lithium metal. Also, lithium metal has a capacity per unit weight of 3860 mAh/g, and thus is regarded as a negative electrode active material having a high capacity per unit weight. Therefore, when a negative active material comprises lithium metal or a lithium alloy, a battery with a low weight and a high capacity may be manufactured.

An example of the lithium battery may be a lithium-air battery or a lithium-sulfur battery.

The positive electrode active material of the lithium battery may comprise oxygen, sulfur, an organosulfur compound, a carbon-sulfur polymer, a transition metal oxide, or an alkali metal-transition metal complex oxide. When the positive electrode active material has a low conductivity, a charge voltage may increase, e.g., due to a large overvoltage, a discharge voltage may decrease, and an irreversible capacity may increase, and thus an improvement in this regard would be desirable.

Surprisingly, it has been found that adding a POM to the positive electrode for a lithium battery promotes redox reactions at the positive electrode.

While not wanting to be bound by theory, it is understood that when the POM is added to the positive electrode, because the POM has an oxidation potential close to that of the positive electrode active material, it is oxidized at the electrode during charging of the battery, and then the POM diffuses to contact a non-oxidized portion of the positive electrode active material and oxidizes the non-oxidized portion of the positive electrode active material. Also, and again not wanting to be bound by theory, it is understood that during discharge of the battery, the POM is reduced at the positive electrode, and then the POM diffuses to contact a non-reduced portion of the positive electrode active material to reduce the non-reduced portion of the positive electrode active material. Therefore, the overvoltage may be reduced and a battery capacity may be increased by promoting a redox reaction of a portion of the positive electrode active material that is not in direct contact with an electrode by including the POM in the positive electrode.

The lithium battery includes a negative electrode comprising lithium metal or a lithium alloy, and thus a protected negative electrode having a protective layer is desirable to obtain an effect caused by adding the POM to the positive electrode while preventing the lithium metal or lithium alloy from reacting with an electrolyte. The protection layer serves to block the positive electrode active material (e.g., oxygen), or an electrolyte comprising the positive electrode active material, from moving toward the negative electrode.

In the negative electrode of a lithium battery, e.g., a lithium-air battery, lithium metal, i.e., $Li^0$, is converted into lithium ions and then arrives at the positive electrode, and when the lithium metal reacts with oxygen, e.g., from air, in the positive electrode, a lithium oxide (e.g., $Li_2O$) is formed and thus the battery is discharged. Also, when a high voltage, e.g., a suitable charging voltage, is applied between the positive and negative electrodes, the battery may be charged by reducing the produced lithium oxide.

If the negative electrode does not include the protection layer described above, the POM included in the positive electrode can move to the negative electrode and then react with the lithium, thereby decreasing an efficiency of the battery. Thus, the protection layer is desirably disposed on a surface of the negative electrode to prevent the POM present in the positive electrode from moving to and reacting with the negative electrode.

The protected negative electrode includes a negative electrode, a first electrolyte, and a protection layer.

The first electrolyte may comprise an electrolyte solution comprising a lithium salt and an organic solvent. Also, a separator may be disposed between the positive electrode and the negative electrode and in the first electrolyte. While not wanting to be bound by theory, it is understood that the separator prevents the protection layer and the lithium of the negative electrode from reacting with each other.

The POM compound is represented by Formula 1.

$$L_a[A_bM_cO_d]$$ Formula 1

In Formula 1,

A is at least one of boron (B), aluminum (Al), silicon (Si), phosphorous (P), sulfur (S), zinc (Zn), gallium (Ga), germanium (Ge), ruthenium (Ru), or a fourth period transition metal element;

M is different from A and is at least one of molybdenum (Mo), tungsten (W), vanadium (V), niobium (Nb), tantalum (Ta), manganese (Mn), iron (Fe), cobalt (Co), chromium (Cr), nickel (Ni), zinc (Zn), rhodium (Rh), ruthenium (Ru), thallium (Tl), aluminum (Al), gallium (Ga), indium (In), or a lanthanoid;

L is at least one of a hydrogen atom, an alkali metal, an alkaline earth metal, an actinoid, $-P(R)_4$, or $-N(R)_4$ wherein each R is independently a hydrogen atom, a C1-C20 alkyl group, a C6-C20 aryl group, or a C2-C20 heteroaryl group;

a, which is a number of Ls needed for charge balancing of the anion $[A_bM_cO_d]$, is a positive integer, for example, an integer of 1 to 5;

b is an integer of 0 to 20;

c is an integer of 1 to 40; and d is an integer of 1 to 180.

As is further disclosed above, M may be different from A. Examples of the fourth period transition metal elements include scandium (Sc), titanium (Ti), vanadium (V), chromium (Cr), manganese (Mn), iron (Fe), cobalt (Co), nickel (Ni), and copper (Cu).

Examples of the lanthanoid include elements with atomic numbers 57 to 71, i.e., lanthanum (La) through lutetium (Lu).

The POM compound may comprise, for example, a compound represented by Formula 2 below.

$$L_a[AM_{12}O_{40}]$$ Formula 2

In Formula 2,

A is at least one of B, Al, Si, P, S, Zn, Ga, Ge, Ru, or a fourth period transition metal element;

M is at least one of Mo, W, or V;

L is at least one of a hydrogen atom, an alkali metal, an alkaline earth metal, an actinoid, $-P(R)_4$, or $-N(R)_4$ wherein each R is independently a hydrogen atom, a C1-C20 alkyl group, a C6-C20 aryl group, or a C2-C20 heteroaryl group; and a is a positive integer.

An example of the C1-C20 alkyl group may be a methyl group, an ethyl group, a propyl group, a butyl group, or a pentyl group; an example of the C6-C20 aryl group may be a phenyl group or a naphthyl group; and an example of the C2-C20 heteroaryl group may be a pyridyl group.

The POM compound may at least one compound of the formula $L_4[SiMo_{12}O_{40}]$, $L_3[PMo_{12}O_{40}]$, or $L_3[PW_{12}O_{40}]$; and L may be tetraalkylammonium.

In the tetraalkylammonium, the alkyl group may be a C1-C10 alkyl group. An example of the tetraalkylammonium may be at least one of tetrabutylammonium, tetraethylammonium, or tetramethylammonium.

Table 1 below shows redox potentials of four different POM compounds, $TBA_4[PMo_{12}O_{40}]$, $TBA_4[SiMo_{12}O_{40}]$, $TBA_4[PW_{12}O_{40}]$, and $TBA_4[SiW_{12}O_{40}]$, wherein "TBA" indicates tetrabutylammonium.

The redox potentials of the POM compounds are measured by using a glassy carbon electrode in tetraethyleneglycoldimethyleter ("TEGDME") containing 1.0 molar (M) of lithium bis(trifluoromethanesulfonyl)imide ("LiTFSI") using cyclic voltammograms of 11 millimolar (mM) $TBA_3$ $[PMo_{12}O_{40}]$, $TBA_4[SiMo_{12}O_{40}]$, $TBA_3[PW_{12}O_{40}]$, or $TBA_4$ $[SiW_{12}O_{40}]$, and scanning at a rate of about 100 millivolts per second (mV/s).

TABLE 1

| Sample | $E_{1/2}$ (in acetonitrile) | $E_{1/2}$ (in TEGDME) |
|---|---|---|
| $[PMo_{12}O_{40}]^{4-} \rightarrow [PMo_{12}O_{40}]^{3-} + e^-$ | 3.37 | 3.36 |
| $[SiMo_{12}O_{40}]^{5-} \rightarrow [SiMo_{12}O_{40}]^{4-} + e^-$ | 3.25 | 3.15 |
| $[PW_{12}O_{40}]^{4-} \rightarrow [PW_{12}O_{40}]^{3-} + e^-$ | 2.91 | 2.91 |
| $[SiW_{12}O_{40}]^{5-} \rightarrow [SiW_{12}O_{40}]^{4-} + e^-$ | 2.54 | 2.58 |

A charging voltage and a discharging voltage of a lithium sulfur battery are related to the reaction shown in Reaction Scheme 1 below, which are, respectively, 2.0 V and 2.4 V.

$$2Li_2S \rightarrow Li_2S_2 + 2Li^+ + 2e^-$$ Reaction Scheme 1

A charging voltage and a discharging voltage of a lithium air battery are related to the reaction shown in Reaction Scheme 2 below, which are, respectively, 2.6 V and 3.54 V.

$$Li_2O_2 \rightarrow O_2 + 2Li^+ + 2e^-$$ Reaction Scheme 2

Since a redox potential of the POM is in the range of Table 1 above, a potential range of the POM is close to the ranges of the charging and discharging voltages of the lithium sulfur battery and the lithium air battery, and thus when the POM is added to a positive electrode, an overvoltage of the electrode may be reduced and a battery capacity may be increased as redox reactions of the positive electrode are promoted.

An amount of the POM may be 1 part to 120 parts by weight, based on 100 parts by weight of the conductive material, for example, may be 5 parts to 110 parts by weight, or 10 parts to 100 parts, based on 100 parts by weight of the conductive material. When the amount of the POM is in the range above, a lithium battery having an excellent charging/discharging capacity without an irreversible capacity may be obtained.

Figure 2:
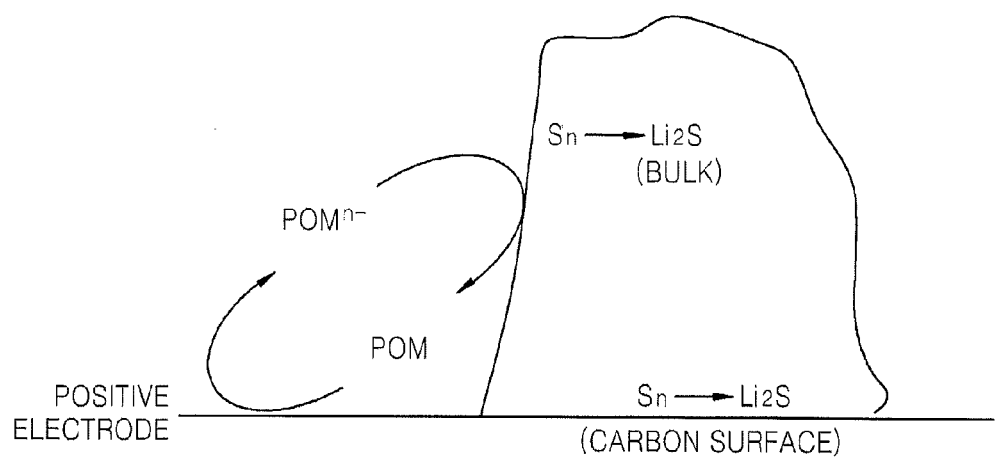
FIG. 2 is a schematic illustration describing an additional effect of a polyoxometalate in an embodiment of a positive electrode of a lithium air battery.
Figure 3:
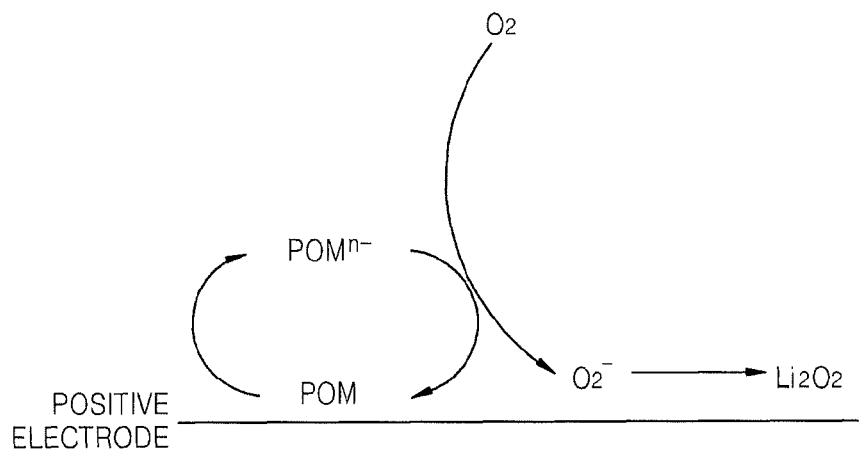
FIG. 3 is a schematic view of an additional effect of the polyoxometalate in an embodiment of a positive electrode of a lithium sulfur battery.

FIGS. 2 and 3 describe an additional effect of the POM in a positive electrode of a lithium sulfur battery or a lithium air battery according to an embodiment in greater detail.

Referring to FIG. 2, the POM present in the positive electrode of the lithium sulfur battery facilitates a reaction of sulfur being reduced to lithium sulfide ($Li_2S$) during discharge of the battery. Also, referring to FIG. 2, the POM present in the positive electrode of the lithium air battery also facilitates a reaction of lithium being reduced to lithium oxide ($Li_2O$) during discharging of the battery.

During discharge of the battery, and while not wanting to be bound by theory, the POM is reduced in the positive electrode and then diffused to an unreduced portion of the positive electrode active material to reduce the unreduced positive electrode active material. In this regard, when POM is added to a positive electrode, the POM promotes reduction of a portion of the positive electrode active material in a bulk state, which may be on a portion of the positive electrode active material present on a carbon surface disposed on a current collector of the positive electrode. Therefore, the POM promotes a redox reaction of the portion of the positive electrode active material which was not in contact with the electrode, and thus an overvoltage may be reduced and a battery capacity may be increased.

The POM may be included in a second electrolyte in addition to the positive electrode. While not wanting to be bound by theory, it is understood that the POM included in the positive electrode or the positive electrode and the second electrolyte can be a redox catalyst and can reduce an overvoltage of a positive electrode active material having a low conductivity, thereby allowing the battery to have a high discharge voltage, a low charge voltage, and an increased charge/discharge capacity.

FIG. 1 schematically illustrates a stacked structure of an embodiment of a lithium battery.

Referring to FIG. 1, a first electrolyte 11 and a negative electrode protection layer 12 are disposed on a negative electrode 10. A separator 9 may be disposed in the first electrolyte 11.

A second electrolyte 13 and a positive electrode 14 are formed on the negative electrode protection layer 12, and the POM is contained in the positive electrode 14.

A protected negative electrode 15 includes a negative electrode 10, the first electrolyte 11, and the negative electrode protection layer 12.

As shown in FIG. 1, the second electrolyte 13 may be disposed between the negative electrode protection layer 12 and the positive electrode 14. The second electrolyte may comprise the polyoxometalate compound.

The negative electrode protection layer 12 protects the negative electrode 10, which is capable of incorporation and deincorporation, e.g., intercalation and deintercalation or alloying and dealloying, of lithium ions and serves as a protection layer, which selectively allows permeation of lithium ions and blocks other materials from contacting and reacting with the negative electrode 10. The negative electrode protection layer 12 may comprise, for example, a lithium ion conductive solid electrolyte membrane or film. Alternatively, the negative electrode protection layer 12 may be an inorganic protection layer or an organic protection layer, such as that which is used as a negative electrode protection layer in a lithium sulfur battery.

The lithium ion conductive solid electrolyte membrane may comprise a glass-ceramic solid electrolyte or a stacked structure of a glass-ceramic solid electrolyte and a solid polymer electrolyte. The lithium ion conductive solid electrolyte membrane will be disclosed in greater detail.

The lithium ion conductive solid electrolyte membrane may comprise an inorganic material comprising at least one of a lithium ion conductive glass, or a crystalline lithium ion conductive compound, e.g., a ceramic or a glass-ceramic. To provide improved chemical stability, the lithium ion conductive solid electrolyte membrane may comprise an oxide.

When the lithium ion conductive solid electrolyte membrane includes a large amount of the crystalline lithium ion conductive compound, the lithium ion conductive solid electrolyte membrane may provide improved ionic conductivity, and thus, for example, the crystalline lithium ion conductive compound may be included at an amount of 50 weight percent (wt %) or greater, 55 wt % or greater, or 60 wt % or greater, or 50 wt % to 99 wt %, or 55 wt % to 95 wt %, based on a total weight of the lithium ion conductive solid electrolyte.

Examples of the crystalline lithium ion conductive compound may include a lithium ion conductive compound having a perovskite structure, such as $Li_3N$, LISICON, or $La_{0.55}Li_{0.35}TiO_3$, $LiTi_2P_3O_{12}$ having a NASICON-type structure, or a glass-ceramic for precipitating these crystals.

The crystalline lithium-ion conductive compound may comprise, for example, $Li_{1+x+y}(Al_pGa_{1-p})_x(Ti_qGe_{1-q})_{2-x}Si_yP_{3-y}O_{12}$ wherein $0 \leq x \leq 1$, $0 \leq y \leq 1$, $0 \leq p \leq 1$, $0 \leq q \leq 1$, for example, $0 \leq x \leq 0.4$, $0 < y \leq 0.6$, or $0.1 \leq x \leq 0.3$, $0.1 < y \leq 0.4$. To attain high ion conductivity, the crystalline lithium-ion conductive compound may not include a grain boundary that interrupts ion conduction. For example, since lithium ion conductive glass-ceramic may rarely include a pore or a grain boundary that interrupts ion conduction, high ion conductivity and excellent chemical stability may be attained.

Examples of the lithium ion conductive glass-ceramic include lithium-aluminum-germanium-phosphate ("LAGP"), lithium-aluminum-titanium-phosphate ("LATP"), lithium-aluminum-titanium-silicon-phosphate ("LATSP"), and the like.

For example, when a mother glass including a composite of $Li_2O$—$Al_2O_3$—$TiO_2$—$SiO_2$—$P_2O_5$ is heat-treated for crystallization, a primary crystal phase of $Li_{1+x+y}Al_xTi_{2-x}Si_yP_{3-y}O_{12}$ (wherein $0 \leq x \leq 1$, and $0 \leq y \leq 1$) may be obtained, wherein x and y satisfy, for example, $0 \leq x \leq 0.4$ and $0 < y \leq 0.6$, or $0.1 \leq x \leq 0.3$ and $0.1 < y \leq 0.4$.

As used herein, a pore or a grain boundary that interrupts ion conduction refers to a structure that reduces the total ion conductivity of an inorganic material including the crystalline lithium ion conductive compound to 1/10 of the ion conductivity of the crystalline lithium ion conductive compound, or less.

The glass-ceramic refers to a material obtained by heat-treating glass to precipitate a crystalline phase from the glass phase, and includes a material in a form of an amorphous solid or a crystalline solid. In addition, the glass-ceramic may include a material whose phase is transformed from an all glass phase to a crystalline phase, for example, such as a material having crystallization of 100 wt %. Although the glass-ceramic material has a crystallization of 100 wt %, pores may rarely exist between crystalline particles or in crystals.

Since the lithium ion conductive solid electrolyte membrane includes a large amount of the glass-ceramic, high ion conductivity may be attained. Thus, 80 wt % of the lithium ion conductive glass-ceramic or more may be included in the lithium ion conductive solid electrolyte membrane. In order to further increase ion conductivity, the amount of the lithium ion conductive glass-ceramic included in the lithium ion conductive solid electrolyte membrane may be 85 wt % or more, or 90 wt % or more, based on a total weight of the lithium ion conductive solid electrolyte membrane.

A $Li_2O$ component included in the glass-ceramic provides a carrier of $Li^+$, and can provide suitable lithium ion conductivity. In order to easily attain high ion conductivity, the amount of the $Li_2O$ component may be, for example, 12 wt % or more, 13 wt % or more, or 14 wt % or more, or 12 wt % to 18 wt %, based on a total weight of the glass-ceramic. If there is an excessively high amount of the $Li_2O$ component, thermal stability of the glass may be easily reduced, and conductivity of the glass-ceramic may be easily reduced. Thus, an upper limit of the amount of the $Li_2O$ component may be 18 wt %, 17 wt % or 16 wt %, based on a total weight of the glass-ceramic.

An $Al_2O_3$ component included in the glass-ceramic may improve a thermal stability of the glass-ceramic matrix. Also, $Al^{3+}$ ions may be in a form of a solid solution in the crystalline phase, thereby improving lithium ion conductivity. In order to further attain this effect, the lower limit of the amount of the $Al_2O_3$ component may be 5 wt %, 5.5 wt %, or 6 wt %, based on a total weight of the glass-ceramic. Also, if the amount of the $Al_2O_3$ component exceeds 10 wt %, the thermal stability of the glass may insufficient, and conductivity of the glass-ceramic may also be reduced. Thus, the upper limit of the amount of the $Al_2O_3$ component may be 10 wt %, 9.5 wt %, or 9 wt %, based on a total weight of the glass-ceramic. The content of the $Al_2O_3$ component in the glass-ceramic may be 5 wt % to 10 wt %, or 5.5 wt % to 9.5 wt %, based on a total weight of the glass-ceramic.

A $TiO_2$ component included in the glass-ceramic may facilitate formation of glass, may constitute the crystalline phase, and may be useful in a glass and in a crystal. To change the crystalline phase to the glass phase, the crystalline phase may be a primary phase and may be precipitated from a glass. In order to easily attain high ion conductivity, the lower limit of the amount of the $TiO_2$ component may be 35 wt %, 36 wt %, or 37 wt %, based on a total weight of the glass-ceramic. If there is an excessively high amount of the $TiO_2$ component, thermal stability of glass may be easily reduced, and conductivity of the glass-ceramic may be easily reduced. Thus, the upper limit of the amount of the $TiO_2$ component may be 45 wt %, 43 wt %, or 42 wt %, based on a total weight of the glass-ceramic. The content of the $TiO_2$ component may be 35 wt % to 45 wt %, or 36 wt % to 43 wt %, based on a total weight of the glass-ceramic.

A $SiO_2$ component included in the glass-ceramic may improve the melting characteristics and thermal stability of the glass-ceramic matrix. Simultaneously, $Si^{4+}$ ions are made to form a solid solution in the crystalline phase, thereby improving lithium ion conductivity. In order to further attain this effect, the lower limit of the amount of the $SiO_2$ component may be 1 wt %, 2 wt %, or 3 wt %, based on a total weight of the glass-ceramic. Also, if there is an excessively high amount of the $SiO_2$ component, conductivity may be reduced. Thus, the upper limit of the amount of the $SiO_2$ component may be 10 wt %, 8 wt %, or 7 wt %, based on a total weight of the glass-ceramic. The content of the $SiO_2$ component may be 1 wt % to 10 wt %, or 2 wt % to 8 wt %, based on a total weight of the glass-ceramic.

A $P_2O_5$ component included in the glass-ceramic may be useful to form glass, and may also constitute the crystalline phase. When the amount of the $P_2O_5$ component is 30% or less, it may be difficult to change the crystalline phase to a glass phase. Thus, the lower limit of the $P_2O_5$ component may be 30 wt %, 32 wt %, or 33 wt %, based on a total weight of the glass-ceramic. If the amount of the $P_2O_5$ component exceeds 40 wt %, it is difficult to precipitate the crystalline phase from glass, and it is difficult to attain the desired property. Thus, the upper limit of the amount of the $P_2O_5$ component may be 40 wt %, 39 wt %, or 38 wt %, based on a total weight of the glass-ceramic. The content of the $P_2O_5$ component may be 30 wt % to 40 wt %, or 32 wt % to 39 wt %, based on a total weight of the glass-ceramic.

When the above-disclosed components are used, the glass may be easily obtained by casting a melted glass. A glass-ceramic having the glass phase obtained by heat-treating the glass may have a high lithium ion conductivity of $1 \times 10^{-3}$ $S \cdot cm^{-1}$.

In addition, a component having a similar crystal structure may be substituted for the above-disclosed components. For example, the $Al_2O_3$ component may be entirely or partially substituted by a $Ga_2O_3$ component, and the $TiO_2$ component may be entirely or partially substituted by a $GeO_2$ component. In addition, when the glass-ceramic is prepared, in order to reduce the melting point of the glass-ceramic or to improve the stability of the glass, a trace of other materials may be added as long as ion conductivity is not significantly reduced.

In some embodiments, the lithium ion conductive solid electrolyte membrane may further include a solid polymer electrolyte, in addition to the glass-ceramic. The solid polymer electrolyte may be polyethylene oxide doped with a lithium salt. Examples of the lithium salt include $LiN(SO_2CF_2CF_3)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlCl_4$, and the like.

The solid polymer electrolyte and the glass-ceramic may constitute a stacked structure. The glass-ceramic may be placed between the two polymer electrolytes.

The lithium ion conductive solid electrolyte membrane may be a single layer or multiple layers.

According to another embodiment, the negative electrode protection layer may comprise at least one of an inorganic protection layer or an organic protection layer, such as that which is used as a negative electrode protection layer in a lithium sulfur battery.

The inorganic protection layer may include at least one element of Li, P, O, S, N, B, Al, F, Cl, Br, I, As, Sb, Bi, C, Si, Ge, In, Tl, Mg, Ca, Sr, or Ba. The inorganic protection layer may further include a polyethylene oxide or a polypropylene oxide, or at least one acrylate selected from the group consisting of polyethyleneglycol diacrylate, polypropyleneglycol diacrylate, ethoxylated neopentyl glycol diacrylate, ethoxylated bisphenol A diacrylate, ethoxylated aliphatic urethane acrylate, ethoxylated alkylphenol acrylate, or an alkyl acrylate.

The organic protection layer may comprise at least one polymer of polyvinylidene fluoride, a copolymer of polyvinylidene fluoride and hexafluoropropylene, poly(vinylacetate), poly(vinylbutyral-co-vinylalcohol-co-vinylacetate), poly(methylmethacrylate-co-ethylacrylate), polyacrylonitrile, polyvinyl chloride-co-vinyl acetate, polyvinylalcohol, poly(1-vinylpyrrolidone-co-vinyl acetate), cellulose acetate, polyvinyl pyrrolidone, polyacrylate, polymethacrylate, polyolefin, polyurethane, polyvinyl ether, acrylonitrile-butadiene rubber, styrene-butadiene rubber, acrylonitrile-butadiene-styrene, a triblock copolymer of sulfonated styrene and ethylene butylene, or polyethylene oxide.

In some embodiments, the protection layer may include $Li_{1+x+y}Al_xTi_{2-x}Si_yP_{3-y}O_{12}$ wherein $0 \le x \le 1$ and $0 \le y \le 1$, wherein x and y may satisfy, for example, $0 \le x \le 0.4$ and $0 < y \le 0.6$, or $0.1 \le x \le 0.3$ and $0.1 < y \le 0.4$.

In some embodiments, the protection layer may include $Li_{1+x+y}Al_x(Ti_aGe_{1-a})_{2-x}Si_yP_{3-y}O_1$ wherein $0 \le x \le 2$, $0 \le y \le 3$, and $0 \le a \le 1$.

A protection layer which is a solid electrolyte membrane that includes $Li_{1.4}Ti_{1.6}Al_{0.4}P_3O_{12}$ ("LTAP") is mentioned.

The first electrolyte 11 includes a lithium salt and an electrolyte solution including an organic solvent. A separator 9 may be disposed in the electrolyte.

The lithium salt may be dissolved in the solvent and thus may serve as a source of lithium ions in the battery. Also, the lithium salt may, for example, facilitate migration of lithium ions between the lithium ion conductive electrolyte membrane and the negative electrode. In particular, the lithium salt may be at least one of $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ wherein x and y are natural numbers, LiF, LiBr, LiCl, LiOH, LiI, and lithium bis(oxalato)borate ($LiB(C_2O_4)_2$; "LiBOB").

An amount of the lithium salt may be 0.01 M to 10 M, for example, 0.1 M to 2.0 M. When the amount of the lithium salt is in the ranges above, the first electrolyte 11 has an appropriate conductivity and viscosity and thus may have an excellent electrolyte performance, and lithium ions may efficiently migrate.

Other metal salts may be included in addition to the lithium salt in the first electrolyte 11, and examples of the other metal salts may include $AlCl_3$, $MgCl_2$, NaCl, KCl, NaBr, KBr, or $CaCl_2$.

The organic solvent may comprise a carbonate-based solvent, an ester-based solvent, an ether-based solvent, a ketone-based solvent, an amine-based solvent, or a phosphine-based solvent.

The carbonate-based solvent may comprise dimethyl carbonate ("DMC"), diethyl carbonate ("DEC"), ethylmethyl carbonate ("EMC"), dipropyl carbonate ("DPC"), methylpropyl carbonate ("MPC"), ethylpropyl carbonate ("EPC"), methylethyl carbonate ("MEC"), ethylene carbonate ("EC"), propylene carbonate ("PC"), or butylene carbonate ("BC").

The ester-based solvent may comprise methyl acetate, ethyl acetate, n-propyl acetate, dimethyl acetate, methyl propionate, ethyl propionate, γ-butyrolactone, decanolide, valerolactone, mevalonolactone, or caprolactone.

The ether-based solvent may comprise dibutyl ether, tetraglyme, diglyme, dimethoxyethane, 2-methyl tetrahydrofuran, or tetrahydrofuran. The ketone-based solvent may comprise cyclohexanone.

Also, the amine-based solvent may comprise triethylamine or triphenylamine. The phosphine-based solvent may be triethylphosphine. However, the solvent is not limited thereto, and any aprotic solvent available in the art may be used.

Also, the aprotic solvent may comprise a nitrile of the formula R—CN (wherein R is a C2 to C20 linear, ranched, or cyclic hydrocarbon, or including a double bond, an aromatic ring, or an ether bond), an amide such as dimethylformamide, a dioxolane such as 1,3-dioxolane, or a sulfolane.

The aprotic solvent may be used singularly or in a mixture. When the organic solvent is used in a mixture, the mixture ratio may be selected to provide suitable battery performance, the details of which may be determined by one of skill in the art without undue experimentation.

Also, the first electrolyte 11 or the second electrolyte 13 may include an ionic solution.

The ionic solution may include a compound comprising at least one of a cation of a linear or branched substituted ammonium cation, a linear or branched substituted imidazolium cation, a linear or branched substituted pyrrolidinium cation, or a linear or branched substituted piperidinium cation, and at least one anion of $PF_6^-$, $BF_4^-$, $CF_3SO_3^-$, $(CF_3SO_2)_2N^-$, $(C_2F_5SO_2)_2N^-$, $(C_2F_5SO_2)_2N^-$, or $(CN)_2N^-$.

A part of or the whole second electrolyte 13 between the negative electrode protection layer 15 and the positive electrode 14 may be impregnated in the positive electrode 14.

The separator may have any appropriate composition which is sufficiently durable in the environment of a lithium battery. Examples of the separator may be at least one of a non-woven fabric such as a polypropylene material, a polymer non-woven fabric such as a polyphenylene sulfide material, or a porous film of an olefin resin such as polyethylene or polypropylene.

The second electrolyte 13 may comprise, for example, an organic electrolyte solution including a lithium salt and a non-aqueous organic solvent.

In some embodiments, the POM compound may be added to the second electrolyte 13. In this regard, a positive electrode for a lithium battery that is obtained by adding the POM compound to the second electrolyte 13 comprises a positive electrode active material, the POM compound, and a conductive material.

The positive electrode 14 includes at least one of oxygen, sulfur, an organosulfur compound, a carbon-sulfur polymer, a transition metal oxide, or an alkali metal-transition metal complex oxide as the positive electrode active material.

The sulfur may be in the form of a powder having a high purity of 98 wt % or more, for example 99 wt % or more. The sulfur powder without any impurities is desirable, and less than 2 wt % of impurities may be included. Examples of the impurities may be Ca, Cd, Co, Cu, Fe, K, Na, Pb, or Zn. When a sulfur powder having a purity of 98 wt % or more is used as the positive electrode active material, a lithium-sulfur battery having a high initial capacity and excellent cycle lifespan characteristic may be provided.

The positive electrode 14 may include a conductive material. The conductive material may be porous. Any suitable positive electrode active material that is porous and conductive may be used. For example, a porous carbon-based material may be used. Examples of the carbon-based material may include carbon black, graphite, graphene, activated carbon, and carbon fiber. Also, the positive electrode active material may comprise a metallic conductive material, such as a metal fiber or a metal mesh. Also, the positive electrode active material may be a metallic powder of copper, silver, nickel, or aluminum. The positive electrode active material may comprise an organic conductive material, such as a polyphenylene derivative. The conductive material may be used singularly or in a mixture.

A catalyst for redox reactions of oxygen may be added to the positive electrode. Examples of the catalyst include a precious metal-based catalyst, such as platinum (Pt), gold (Au), silver (Ag), palladium (Pd), ruthenium (Ru), rhodium (Rh), or osmium (Os); an oxide-based catalyst, such as a manganese oxide, iron oxide, cobalt oxide, or a nickel oxide;

or an organic metal-based catalyst, such as a cobalt phthalocyanine, but are not limited thereto. Any appropriate catalyst for redox reactions of oxygen available in the art may be used.

The catalyst may be disposed on a support. Examples of the support include an oxide, zeolite, a clay mineral, and carbon. The oxide may include at least one oxide of alumina, silica, zirconium oxide, or titanium dioxide. The oxide may be an oxide bearing at least one metal of cerium (Ce), praseodymium (Pr), samarium (Sm), europium (Eu), terbium (Tb), thulium (Tm), ytterbium (Yb), antimony (Sb), bismuth (Bi), vanadium (V), chromium (Cr), manganese (Mn), iron (Fe), cobalt (Co), nickel (Ni), copper (Cu), niobium (Nb), molybdenum (Mo), or tungsten (W). Examples of the carbon available as the support include, but are not limited to, carbon blacks, such as ketjen black, acetylene black, channel black, and lamp black; graphites, such as natural graphite, artificial graphite, and expanded graphite; activated carbons; and carbon fibers. Any appropriate material available as a support in the art may be used.

The positive electrode may further include a binder. The binder may include a thermoplastic resin or a thermocurable resin. Examples of the binder include, but are not limited to, at least one of polyethylene, polypropylene, polytetrafluoroethylene ("PTFE"), polyvinylidene fluoride ("PVDF"), styrene-butadiene rubber, a tetrafluoroethylene-perfluoroalkylvinylether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a fluorovinylidene-pentafluoro propylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinylether-tetrafluoro ethylene copolymer, or an ethylene-acrylic acid copolymer, which may be used singularly or in a mixture. Any appropriate binder available in the art may be used.

To manufacture the positive electrode, a redox catalyst for oxygen, a conducting agent, and a binder may be combined to form a mixture, and then the mixture added to an appropriate solvent to prepare a positive electrode slurry. The positive electrode slurry may be coated on a surface of a current collector and dried, optionally followed by press-molding to improve an electrode density, thereby resulting in the positive electrode. The positive electrode may optionally include a lithium oxide. The redox catalyst for oxygen may be optionally omitted.

A porous body in a matrix or mesh form may be used as the current collector to facilitate diffusion of oxygen. A porous metal plate made of, for example, stainless steel, nickel, or aluminum may be used. Materials for the current collector are not particularly limited, and any appropriate material for the current collector available in the art may be used. The current collector may be coated with an anti-oxidation metal or alloy to prevent oxidation.

The negative electrode 10 may be lithium metal or a lithium metal-based alloy.

Examples of the lithium-based alloy may be an alloy of lithium and a metal of aluminum, tin, magnesium, indium, calcium, titanium, vanadium, sodium, potassium, rubidium, cesium, strontium, or barium.

As used herein, the term "air" is not limited to atmospheric air, and may refer to any suitable combination of gases including oxygen, or pure oxygen gas. This broad definition of "air" also applies to other terms including "air battery" and "air positive electrode".

The lithium air battery according to an embodiment may be used to provide a lithium primary battery or a lithium secondary battery. The lithium air battery may have any of various shapes, may be rectilinear or curvilinear, and in some embodiments, may have a shape of a coin, a button, a sheet, a stack, a cylinder, a plane, or a horn. The lithium air battery may be used as a large-scale battery for an electric vehicle.

In an embodiment, a method of manufacturing a lithium battery comprises: providing a positive electrode comprising the conductive material; disposing a protected negative electrode including the negative electrode, the first electrolyte, and the protection layer on the positive electrode; and contacting the positive electrode with the second electrolyte including a polyoxometalate compound to manufacture the lithium battery.

Hereinafter, one or more embodiments of the present disclosure will be described in further detail with reference to the following examples. However, the examples are not intended to limit the scope of the one or more embodiments of the present disclosure.

EXAMPLES

Example 1

Preparation of Lithium Sulfur Battery 4.75 g of polyvinylidene fluoride and 4.75 g of acetylene black were combined to form a mixture, the mixture was dispersed in 90.5 g of N-methylpyrrolidone, and 14.3 g of sulfur was mixed thereto to prepare a slurry. The slurry was added to a C-Mixer and balls were added thereto, and then mechanical mixing was performed at a rate of 1000 revolutions per minute ("RPM") for 10 minutes to prepare a slurry for forming a positive electrode active material layer.

The slurry for forming a positive electrode active material layer was coated on a carbon-coated aluminum foil at a thickness of 150 mm by using a doctor blade, and then vacuum dried at a temperature of 80° C. for 1 hour and 60° C. for 4 hours to obtain a sulfur positive electrode.

Separately, a polypropylene separator and a lithium conductive film of $Li_{1+x+y}Al_x(Ti,Ge)_{2-x}Si_yP_{3-y}O_1$, wherein $0 \leq x \leq 2$, $0 \leq y \leq 3$, "LICGC," from Ohara Inc., having a thickness of about 300 μm were disposed on a lithium metal, and the stacked structure was wrapped with an aluminum pouch having a thickness of about 20 μm to prepare a lithium metal/polypropylene separator/lithium conductive film structure. Then, a propylene carbonate ("PC") solution, in which 1 M of lithium bis(trifluoromethanesulfonyl)imide ("LiTFSI") was dissolved to provide a first electrolyte, was injected in to the structure, and thus a protected negative electrode including a lithium metal negative electrode/first electrolyte/lithium conductive film was assembled.

The protected negative electrode was disposed proximate to the positive electrode such that a lithium conductive film of the structure was close to a surface of the sulfur positive electrode. Also, the resultant was wrapped with an aluminum pouch having a thickness of about 20 μm to prepare a battery assembly. A second electrolyte comprising 1M LiTFSI and 50 microliters (μL) of a sulfolane solution, in which 10 mM of $TBA_4[SiMo_{12}O_{40}]$ (TBA: tetrabutylammonium) was dissolved, was injected to the battery assembly to manufacture a lithium sulfur battery including a lithium metal negative electrode/first electrolyte/lithium conductive film/second electrolyte/sulfur positive electrode.

In the lithium sulfur battery, a content of the POM compound $TBA_4[SiMo_{12}O_{40}]$ was 110 parts by weight, based on 100 parts by weight of acetylene black, which was a conductive material.

It was confirmed that $TBA_4[SiMo_{12}O_{40}]$ was present in the positive electrode when $TBA_4[SiMo_{12}O_{40}]$ was added to the electrolyte.

Example 2

Preparation of Lithium Air Battery 200 mg of SUPER P carbon (Timcal), 57.1 mg of $TBA_4$ $[PMo_{12}O_{40}]$ were combined to form a mixture, and the mixture combined with 356 mg of an NMP solution of 8 wt % PVDF. 2 milliliters (mL) of NMP was further added to the mixture to prepare a slurry for forming a positive electrode active material layer.

The slurry for forming the active material layer was coated on a gas diffusion layer ("GDL"), and dried at room temperature for 12 hours. Then, the resultant was vacuum dried at a temperature of 80° C. for 2 hours and 120° C. for 2 hours to prepare a positive electrode.

Separately, a polypropylene separator and a lithium conductive ceramic $(Li_{1+x+y}Al_x(Ti,Ge)_{2-x}Si_yP_{3-y}O_1$, wherein $0 \le x \le 2$, $0 \le y \le 3$, "LICGC," Ohara Inc.), having a thickness of about 300 μm were disposed on lithium metal, the stacked structure was wrapped with an aluminum pouch having a thickness of about 20 μm to prepare a lithium metal/polypropylene separator/lithium conductive film structure. Then, a propylene carbonate ("PC") solution, in which 1 M of LiTFSI was dissolved, was injected to the structure, and thus a protected negative electrode including a lithium metal negative electrode/first electrolyte/lithium conductive film was assembled.

A hole having a size of 1 cm×1 cm was punctured in a center of a aluminum pouch having a size of 5 cm×5 cm, and a lithium conductive ceramic (Ohara Inc.) having a size of 1.4 cm×1.4 cm was attached thereto by using an adhesive to block the hole, and thus a window of the protected negative electrode for exposing a part of the lithium conductive ceramic was manufactured.

The lithium conductive film of the protected negative electrode was disposed such that a lithium conductive film of the structure was close to a surface of the sulfur positive electrode.

A liquid electrolyte was filled in through the window of the protected negative electrode, and the positive electrode was stacked thereon to manufacture a lithium air battery.

The liquid electrolyte was a tetraethylene glycol dimethyl ether solution, in which 1 M LiTFSI was dissolved.

In the lithium air battery, a content of the POM compound, $TBA_4[PMo_{12}O_{40}]$, was 29 parts by weight, based on 100 parts by weight of the SUPER P, which was a conductive material.

Example 3

Preparation of Lithium Air Battery

A lithium air battery was manufactured in the same manner as in Example 2, except that $TBA_4[SiMo_{12}O_{40}]$ was used instead of $TBA_3[PMo_{12}O_{40}]$.

Example 4

Preparation of Lithium Air Battery

A lithium air battery was manufactured in the same manner as in Example 2, except that $TBA_3[PW_{12}O_{40}]$ was used instead of $TBA_3[PMo_{12}O_{40}]$.

Examples 5-6

Preparation of Lithium Sulfur Battery

Lithium sulfur batteries were manufactured in the same manner as in Example 1, except that concentrations of $TBA_4[SiMo_{12}O_{40}]$ were respectively 5 mM and 1 mM instead of 10 mM when preparing the positive electrode slurry.

A content of the POM compound $TBA_4[SiMo_{12}O_{40}]$ in the lithium sulfur battery prepared in Example 5 was 70 parts by weight, based on 100 parts by weight of acetylene black, which is a conductive material, and a content of the POM compound $TBA_4[SiMo_{12}O_{40}]$ in the lithium sulfur battery prepared in Example 6 was 14 parts by weight, based on 100 part by weight of acetylene black, which is a conductive material.

Examples 7-8

Preparation of Lithium Air Battery

Lithium air batteries were manufactured in the same manner as in Example 1, except that content of $TBA_4$ $[SiMo_{12}O_{40}]$ was 20 mg and 10 mg in Examples 7 and 8, respectively, when preparing the positive electrode slurry.

A content of the POM compound in the lithium air battery prepared in Example 7 was 10 parts by weight, based on 100 parts by weight of acetylene black, which is a conductive material, and a content of the POM compound in the lithium air battery prepared in Example 8 was 5 parts by weight, based on 100 part by weight of acetylene black, which is a conductive material.

Comparative Example 1

Preparation of Lithium Sulfur Battery

A lithium sulfur battery was manufactured in the same manner as in Example 1, except that 50 μL of a sulfolane solution, in which 1 M of LiTFSI was dissolved, was used instead of 50 μL of a sulfolane solution, in which 10 mM of $TBA_4[SiMo_{12}O_{40}]$ and 1 M LiTSFI were dissolved as an electrolyte that is injected in to the battery assembly.

Comparative Example 2

Preparation of Lithium Sulfur Battery

A sulfur positive electrode was prepared in the same manner as in Example 1.

Separately, a polypropylene separator was stacked on a lithium metal negative electrode.

The polypropylene separator and the lithium metal negative electrode are stacked on a surface of the sulfur positive electrode, and the stacked structure was wrapped with an aluminum pouch having a thickness of about 20 μm to prepare a battery assembly. Then, a sulfolane solution, in which 1 M of LiTFSI is dissolved, was injected as an electrolyte into the battery assembly to prepare a lithium sulfur battery having a lithium metal negative electrode/polypropylene separator and electrolyte/sulfur positive electrode structure.

Comparative Example 3

Preparation of Lithium Air Battery

A lithium air battery was prepared in the same manner as in Example 3, except that $TBA_4[SiMo_{12}O_{40}]$ was not used when preparing the slurry for forming a positive electrode active material layer.

Comparative Example 4

Preparation of Lithium Air Battery

A lithium air battery was prepared in the same manner as in Example 3, except that a lithium metal, a polypropylene separator and a tetraethylene glycol dimethyl ether solution, in which 1 M of LiTFSI instead of the protective negative electrode, were used.

Evaluation Example 1

Discharge Characteristic Measurement of Lithium Sulfur Battery

1) Example 1 and Comparative Examples 1 and 2

Figure 4:
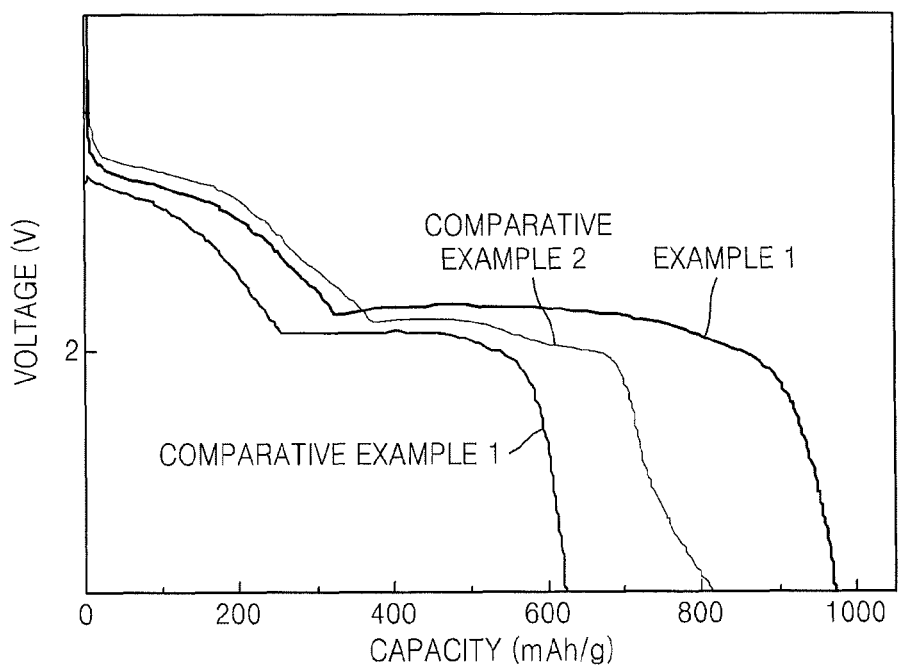
FIG. 4 is a graph of voltage (V) versus specific capacity (milliampere-hours per gram, mAh/g) and is a discharge graph of lithium sulfur batteries prepared in Example 1 and Comparative Examples 1 and 2.

Lithium sulfur batteries prepared in Example 1 and Comparative Examples 1 and 2 were charged/discharged at 0.2 C for charging and 0.5 C for discharging, and a one cycle capacity and a discharge voltage were measured for each of the lithium sulfur batteries. The results are shown in Table 2 below. Also, a discharge graph of the lithium sulfur batteries prepared in Example 1 and Comparative Examples 1 and 2 are shown in FIG. 4.

TABLE 2

| | Presence of a negative electrode protection layer | Type of POM | Discharge voltage of first cycle (V) | Discharge capacity of first cycle (mAh/g) |
|---|---|---|---|---|
| Example 1 | Yes | $TBA_4[SiMo_{12}O_{40}]$ | 2.1 | 972 |
| Comparative Example 1 | Yes | — | 1.8 | 621 |
| Comparative Example 2 | No | $TBA_4[SiMo_{12}O_{40}]$ | 2.0 | 813 |

Referring to Table 2, it is confirmed that an improved discharge voltage of the lithium sulfur battery prepared in Example 1 is improved compared to those of the lithium sulfur batteries prepared in Comparative Examples 1 and 2.

Referring to FIG. 4, it is confirmed that a capacity of the lithium sulfur battery prepared in Example 1 was improved compared to those of the lithium sulfur batteries prepared in Comparative Examples 1 and 2 at the same voltage. Also, in the case of the lithium sulfur battery prepared in Comparative Example 2 without a negative electrode protection layer, capacity characteristics of the battery are degraded, unlike the battery prepared in Example 1, even though the POM is contained in the positive electrode. In this regard, it may be confirmed that a lithium secondary battery including a lithium negative electrode containing lithium metal or a lithium alloy may have an additional effect of the POM when a negative electrode protection layer is included.

2) Examples 1, 5, and 6 and Comparative Examples 1-2

Figure 6:
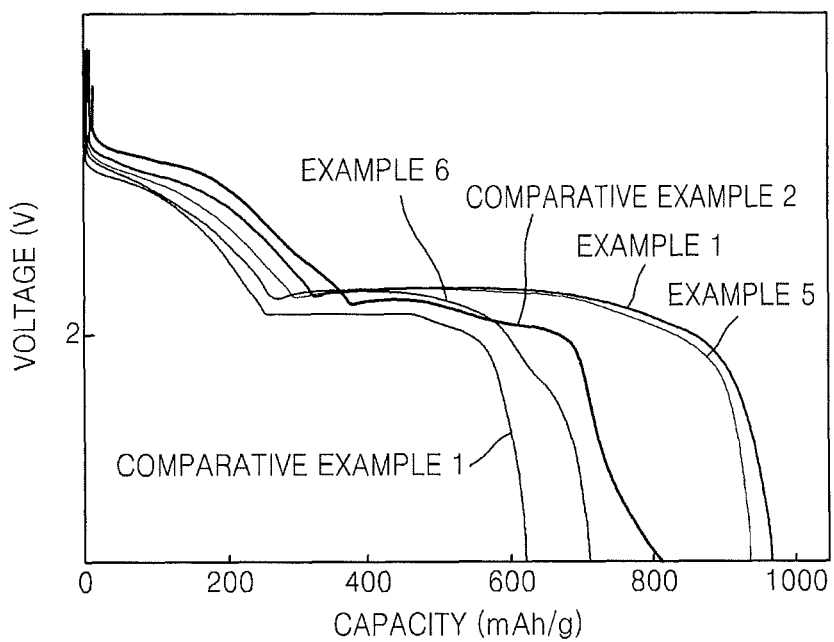
FIG. 6 is a graph of voltage (V) versus specific capacity (milliampere-hours per gram, mAh/g) and is a discharge graph of lithium sulfur batteries prepared in Examples 1, 5, and 6 and Comparative Examples 1 and 2.

Lithium sulfur batteries prepared in Examples 1, 5, and 6 and Comparative Examples 1 and 2 were charged/discharged at 0.2 C for charging and 0.5 C for discharging, and a one cycle capacity and a discharge voltage were measured for each of the lithium sulfur batteries. The results are shown in FIG. 6. FIG. 6 shows a discharge graph of the lithium sulfur batteries prepared in Examples 1, 5, and 6, and Comparative Examples 1 and 2.

Referring to FIG. 6, it is confirmed that capacity characteristics of the lithium sulfur batteries prepared in Examples 1, 5, and 6 were improved compared to those of the lithium sulfur batteries prepared in Comparative Examples 1 and 2.

Evaluation Example 2

Discharge Capacity Measurement of Lithium Air Battery

Figure 5:
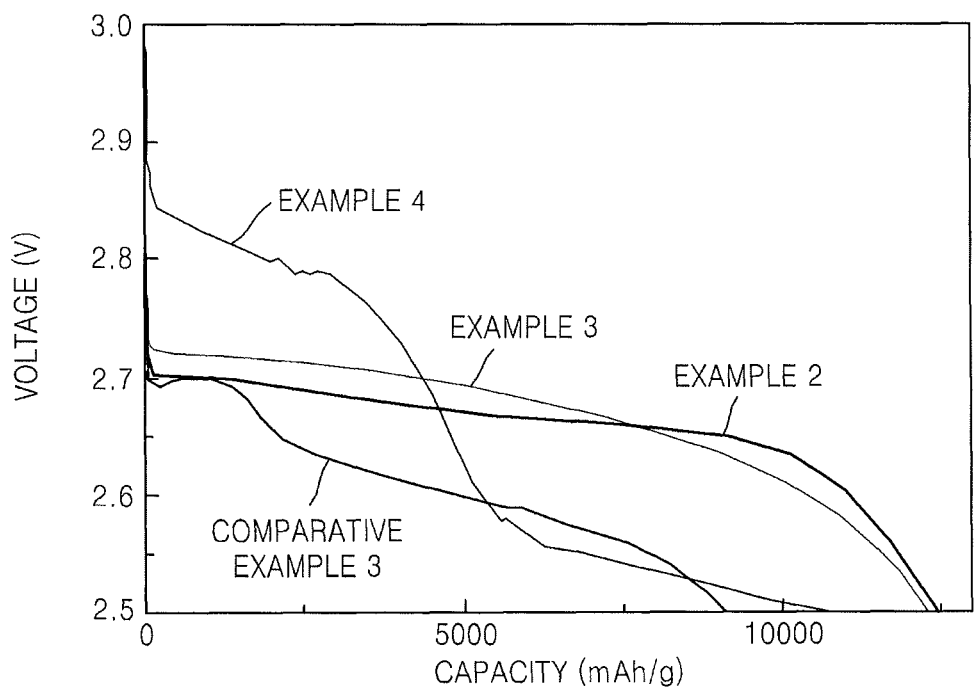
FIG. 5 is a graph of voltage (V) versus specific capacity (milliampere-hours per gram, mAh/g) and is a discharge graph of lithium sulfur batteries prepared in Examples 2 to 4 and Comparative Examples 2 and 3.

Lithium air batteries prepared in Examples 2-4 and Comparative Examples 3-4 were discharged at a temperature of 60° C. with constant current of 0.1 mA/cm² and a cut-off voltage of 2.5 V to 4.2 V, and a discharge voltage and a discharge capacity measured for each of the lithium air batteries are shown in Table 3 below. Also, FIG. 5 shows a discharge graph of the lithium air batteries prepared in Examples 2 to 4 and Comparative Example 3.

TABLE 3

| | Presence of a negative electrode protection layer | Type of POM | Discharge voltage of one cycle (V) | Discharge capacity of one cycle (mAh/g) |
|---|---|---|---|---|
| Example 2 | Yes | $TBA_3[PMo_{12}O_{40}]$ | 2.7 | 12500 |
| Example 3 | Yes | $TBA_4[SiMo_{12}O_{40}]$ | 2.7 | 12300 |
| Example 4 | Yes | $TBA_3[PW_{12}O_{40}]$ | 2.7 | 10800 |
| Comparative Example 3 | Yes | $TBA_4[SiMo_{12}O_{40}]$ | 2.6 | 9100 |
| Comparative Example 4 | No | $TBA_4[SiMo_{12}O_{40}]$ | 2.6 | 5100 |

Referring to Table 3, it is confirmed that discharge voltages and discharge capacities of the lithium air batteries prepared in Examples 2 to 4 were improved compared to those of the lithium air batteries prepared in Comparative Examples 3 and 4.

Also, referring to FIG. 5, it is confirmed that capacities of the lithium air batteries prepared in Examples 2 to 4 were improved compared to that of the lithium air battery of Comparative Example 3 at the same voltage. As described above, according to the one or more of the above embodiments, in a lithium battery including a negative electrode containing a lithium metal or a lithium alloy, the lithium battery may have a reduced overvoltage and improved charging/discharging capacity characteristics by facilitating redox reactions of a positive electrode by using a positive electrode using POM.

It should be understood that the exemplary embodiments disclosed herein should be considered in a descriptive sense only and not for purposes of limitation. Descriptions of features, advantages, or aspects within each embodiment should be considered as available for other similar features, advantages, or aspects in other embodiments.

What is claimed is:

1. A lithium battery comprising:
   a protected negative electrode comprising a lithium metal or a lithium alloy; and
   a positive electrode comprising
      at least one of oxygen, sulfur, an organosulfur compound, and a carbon-sulfur compound,
      a polyoxometalate compound, and a conductive material,
   wherein the polyoxometalate compound is represented by Formula 2:

$$L_a[AM_{12}O_{40}] \quad \text{Formula 2}$$

wherein
      A is at least one of B, Al, Si, P, S, Zn, Ga, Ge, Ru, or a fourth period transition metal;
      M is at least one of Mo, W, or V; and
      L is at least one of a hydrogen atom, an alkali metal, an alkaline earth metal, an actinoid, $-P(R)_4$, or $-N(R)_4$ wherein each R is independently a hydrogen atom, a C1-C20 alkyl group, a C6-C20 aryl group, or a C2-C20 heteroaryl group, and
      a is a positive integer, and
   wherein the protected negative electrode comprises a negative electrode containing a lithium metal or a lithium alloy, a first electrolyte, and a protection layer.

2. The lithium battery of claim 1, wherein the polyoxometalate compound is $L_4[SiMo_{12}O_{40}]$, $L_3[PMo_{12}O_{40}]$, or $L_3[PW_{12}O_{40}]$, wherein L is tetraalkylammonium.

3. The lithium battery of claim 1, wherein a content of the polyoxometalate compound is 1 part to 120 parts by weight, based on 100 parts by weight of the conductive material.

4. The lithium battery of claim 1, wherein the protected negative electrode comprises
   a negative electrode comprising the lithium metal or the lithium alloy,
   a first electrolyte on the negative electrode, and
   a protection layer on the first electrolyte and proximate to the positive electrode.

5. The lithium battery of claim 4, wherein the protection layer comprises a lithium ion conductive solid electrolyte.

6. The lithium battery of claim 5, wherein the lithium ion conductive solid electrolyte is in a form of a membrane.

7. The lithium battery of claim 5, wherein the lithium ion conductive solid electrolyte comprises at least one of $Li_{1+x+y}(Al_pGa_{1-p})_x(Ti_qGe_{1-q})_{2-x}Si_yP_{3-y}O_{12}$ wherein $0 \leq x \leq 1$, $0 \leq y \leq 1$, $0 \leq p \leq 1$, and $0 \leq q \leq 1$, $Li_3N$, $Li_{3+x}ZrSi_{3-y}P_{1-y}O_{12-x}$, $La_{0.55}Li_{0.35}TiO_3$, $LiTi_2P_3O_{12}$, lithium-aluminum-germanium-phosphate, lithium-aluminum-titanium-phosphate, or lithium-aluminum-titanium-silicon-phosphate.

8. The lithium battery of claim 7, wherein the lithium ion conductive solid electrolyte comprises a glass-ceramic solid electrolyte of the formula $Li_{1+x+y}Al_xTi_{2-x}Si_yP_{3-y}O_{12}$ wherein $0 \leq x \leq 1$, and $0 \leq y \leq 1$.

9. The lithium battery of claim 8, wherein in $Li_{1+x+y}Al_xTi_{2-x}Si_yP_{3-y}O_{12}$, x and y satisfy $0 \leq x \leq 0.4$ and $0 \leq y \leq 0.6$.

10. The lithium battery of claim 4, wherein the first electrolyte comprises an electrolyte solution comprising a lithium salt and a non-aqueous organic solvent.

11. The lithium battery of claim 10, wherein the lithium salt is at least one of $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$, LiF, LiBr, LiCl, LiOH, LiI, or $LiB(C_2O_4)_2$, wherein x and y are each independently a natural number.

12. The lithium battery of claim 1, further comprising a separator between the positive electrode and the protected negative electrode, wherein the separator comprises polyethylene, polypropylene, or a combination thereof.

13. A lithium battery comprising:
   a protected negative electrode comprising a lithium metal or a lithium alloy;
   a first electrolyte on the negative electrode;
   a protection layer on the first electrolyte and proximate to a positive electrode, the positive electrode comprising a polyoxometalate compound and a conductive material; and
   a second electrolyte, wherein the second electrolyte comprises a lithium salt and an organic solvent and is disposed between the positive electrode and the protection layer.

* * * * *